United States Patent [19]

Liszka et al.

[11] Patent Number: 4,918,805
[45] Date of Patent: Apr. 24, 1990

[54] WELDING METHOD FOR CYLINDER HEAD REPAIR

[75] Inventors: Kenneth J. Liszka, Downers Grove; Daniel J. Dobruse, Oak Park, both of Ill.; Steve E. Potopa, Phillips, Wis.; Charles E. Gammill, Greenville; Jerry D. Gammill, Leland, both of Miss.

[73] Assignee: General Motors Corporation, Detroit, Mich.

[21] Appl. No.: 288,521

[22] Filed: Dec. 22, 1988

[51] Int. Cl.$^5$ ............................................. B23P 15/00
[52] U.S. Cl. ................... 29/888.06; 228/119; 228/232
[58] Field of Search ............... 29/156.4 R, 402.16, 29/402.18; 228/232, 119

[56] References Cited

U.S. PATENT DOCUMENTS

| | | | |
|---|---|---|---|
| 3,192,618 | 7/1965 | Altgelt | 228/119 |
| 3,246,392 | 4/1966 | Altgelt | 228/119 |
| 3,445,914 | 5/1969 | Altgelt | 228/119 |
| 3,449,816 | 6/1969 | Swick et al. | 228/119 |
| 4,285,459 | 8/1981 | Baladianian et al. | 29/402.18 |
| 4,655,383 | 4/1987 | Fournes et al. | 228/119 |

Primary Examiner—Howard N. Goldberg
Assistant Examiner—Irene Cuda
Attorney, Agent, or Firm—Robert J. Outland

[57] ABSTRACT

A method for weld repair and rebuilding of worn and cracked diesel engine cylinder heads of the pot-type is used in railway locomotive diesel engines and the like. The method involves carefully controlled preheating, welding and cooling steps.

5 Claims, 1 Drawing Sheet

WELDING METHOD FOR CYLINDER HEAD REPAIR

TECHNICAL FIELD

This invention relates to repair and rebuilding of pot-type cast iron cylinder heads for diesel engines, especially of the type used in diesel locomotives and other applications, and, more particularly, to a method for repairing surface cracks and building up worn surfaces by welding.

BACKGROUND

It is known in the art to rebuild pot-type diesel engine cylinder heads for diesel locomotive engines and the like using a process that includes buildup of a worn surface and repair of surface cracks by welding.

In this prior process, the cylinder head is pre-heated to red heat in an oven designed to contain a single head member. The fireface (the portion exposed to combustion in the engine combustion chamber) may then be built up by welding and any remaining cracks are welded. The welded part is then cooled and machined to finish dimensions.

This prior process has proven capable of providing weld repaired cylinder heads of better quality than has resulted from some other processes that have been used; however, consistent quality and control of the cast metal structure has not previously been obtained.

SUMMARY OF THE INVENTION

The present invention provides improvements in the procedures of the prior process which have provided more consistent and dependable rebuilt cylinder heads. Rebuilt heads made according to the invention provide metallographic structure comparable to new cylinder heads and thereby improve durability of the resulting rebuilt cylinder heads.

The improved method according to the invention includes the prior steps of:
  determining the locations of any cracks and rejecting any head with cracks in the fireface or barrel that go through to the water jacket;
  placing each non-rejected head in an individual insulated oven having an insulated lid;
  preheating the head in the oven with a gas flame to a suitable temperature for welding;
  building up the entire fireface with weld metal applied by oxy acetylene welding;
  oxy acetylene welding the cracks in the head while maintaining the preheat temperature and protecting the valve seats and injector well from contact with molten weld metal;
  after welding, encapsulating the head in the oven with the lid in place and allowing to cool; and
  rough machining the fireface and valve guides and inspecting for remaining cracks prior and to finish machining.

In addition, the improved method of the invention adds the following improvements to the prior process:
  establishing the suitable preheating temperature in a range of from about 1800 to 2000 degrees F. and attaining this temperature over a time period of at least 40 minutes to assure thorough heat soaking to the minimum temperature;
  welding the fireface with cast iron welding rod essentially equivalent to AWS RC1-A specification, preferably using a 214 Smith torch tip or its equivalent;
  welding all other repair areas with cast iron welding rod equivalent to AWS RC1-A specification, preferably using a 610 Smith torch tip or its equivalent; and
  continuing the encapsulated oven cooling step until near ambient temperature is reached, preferably for at least 24 hours.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
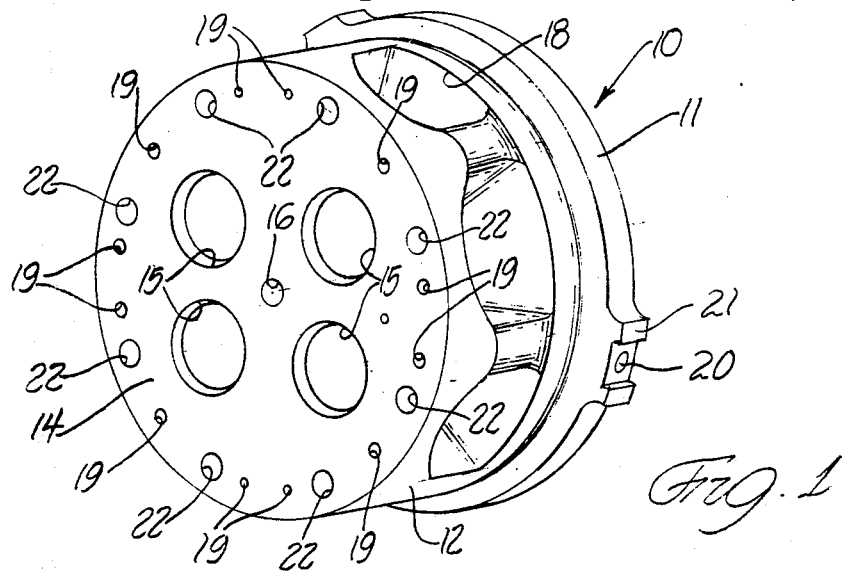
FIG. 1 is a pictorial view of a pot-type cylinder head for a locomotive diesel engine subject to rebuild in accordance with the method of the invention.

Referring now to the drawings in detail, numeral 10 generally indicates a pot-type diesel engine cylinder head of a type used in model 567, 645 and 710 EMD diesel engines for locomotives and other applications. The head has been prepared for rebuilding according to the invention. The prepared cylinder head includes an upper mounting flange 11 and a depending barrel 12 terminating at the bottom in a fireface 14.

In the fireface, there are four exhaust valve ports 15 and an injector opening 16 centered between the valve ports. On one side of the barrel, a wide outlet port 18 is provided for exhaust passages inside the barrel and extending from the valve ports 15 to the side outlet port 18.

Internally also, the head is provided with a coolant jacket, not shown, through which coolant flows from a plurality of inlet holes 19 surrounding the fireface on the lower end of the barrel to an outlet opening 20 in a coolant outlet flange 21 on the side of the flange 11. Additional bores 22 extend upward from the periphery of the lower surface through internal columns (not shown) in the head for receiving studs by which the head is attached to an associated cylinder liner.

As applied, the cylinder head is assembled with four exhaust valves (not shown) closing the valve ports 15, a pair of rocker studs (not shown) adapted to receive a rocker arm assembly for actuating the exhaust valves and an injector stud (not shown) for retaining a unit fuel injector (not shown) extending into the injector opening 16.

In use, the cylinder head experiences wear at locations such as the valve seats in the valve ports 15 and the lower surface of the mounting flange 11. Additionally, the temperature extremes and cycling experienced in service may cause cracks to occur in the fireface surface, the barrel or other locations.

When a cylinder head is removed, such as during engine overhaul, it is normally inspected and may be reused if not excessively worn or damaged. If desired, the head may be remachined to rebuild specifications if the degree of wear permits. If not, or if there are cracks in the fireface or barrel that do not penetrate to the coolant jacket, the head may be repairable through weld rebuilding in accordance with the present invention.

REBUILD METHOD

To apply the rebuild method of this invention to pot-type cylinder heads of the type described, the used head is disassembled and the studs may be removed. The head is then cleaned by a suitable non-destructive method, such as by dipping in a caustic bath and wire brushing.

A magnetic inspection is then made to determine the location and depth of any cracks. If cracks are found in the fireface or barrel that extend to the water jacket or there are cracks at the mounting flange fillet radius or in the coolant outlet flange, repair is not recommended. In addition, weld repair of heads that were previously welded is not recommended at present.

A dimensional inspection is then made to assure that the head can be rebuilt to specified dimensions. Rocker arm and injector studs (not shown) are then removed if this has not been done previously.

Figure 2:
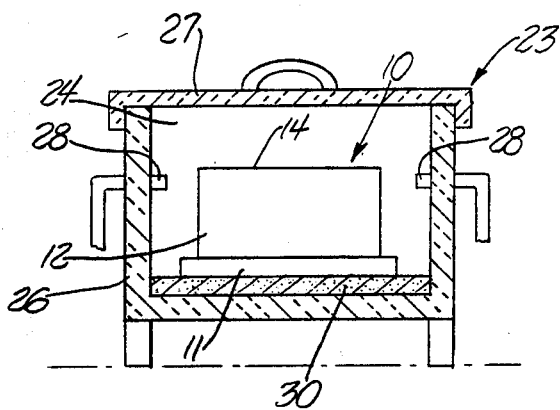
FIG. 2 is a cross-sectional view showing a cylinder head encapsulated within an insulated oven for preheating or cooling in accordance with the invention.

As shown in FIG. 2, the prepared head is then placed in an oven 23 having an insulated cavity 24 sized to accept only a single cylinder head 10. The oven cavity must be properly insulated with firebrick and/or other conventional insulating materials 26 and provided with an insulated cover 27. Side gas jets 28 giving a large plume gas flame are provided to obtain even heating of the head with the cover in place. The bottom of the cavity 24 is preferably covered with sand 30 to avoid cooling the head surfaces on which it is seated.

The head is preheated in the oven, preferably using a large plume natural gas flame, to a temperature range of between 1800 and 2000 degrees F. To assure adequate temperature throughout the head, the heating time is preferably not less than 40 minutes and should not be more than an hour to avoid overheating and possibly damaging the head. Prior to welding, the temperature should be confirmed by a calibrated pyrometer such as Illinois Testing Laboratory Inc.—Type 4500.

Figure 3:
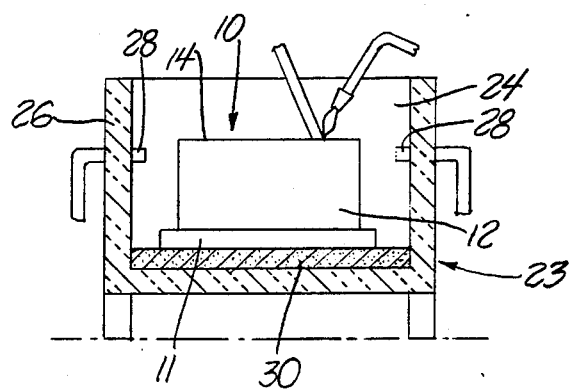
FIG. 3 is a pictorial view showing the applying of weld metal to the fireface of a preheated head within an oven.

Welding is performed in the individual preheat and welding oven 23 with the cover 27 removed as shown in FIG. 3. The preheat flame must be used as required to maintain the head temperature in the 1800–2000 degree F. range during welding. The valve guide bores and the injector well are protected from damage during welding by placing carbon pellets in their exposed openings or by any other suitable means. Welding is accomplished preferably using the oxy acetylene process.

Preferably, the entire fireface of the head is first built up (for the purpose of building up the valve seats) using a cast iron welding rod equivalent to American Welding Society specification AWS RC1-A. A 214 Smith torch tip or equivalent is preferably used for this step.

Thereafter, all other areas of the head that require repair are welded, preferably using the AWS RC1-A specification cast iron welding rod equivalent and a 610 Smith torch tip or equivalent.

At the completion of welding, the insulated cover is placed on the welding oven and the head is encapsulated therein for slow cooling for a period of, preferably, 24 hours to assure that the entire head has has reached a near ambient temperature prior to removal so as to minimize the presence of any residual stresses.

At this time, the weld-repaired head is ready to be machined to the finished dimensions, tested for leaks and soundness and assembled for use in accordance with current practices.

It is intended that the invention not be limited to the disclosed embodiments, but that it have the full scope permitted by the language of the following claims.

The embodiments of the invention in which an exclusive property or privilege is claimed are defined as follows:

1. A method for repair and rebuilding of pot-type cast iron cylinder heads for diesel engines, said method including the steps of:
   determining the locations of any cracks and rejecting any heads unsuitable for repair;
   placing each non-rejected head in an individual insulated oven having an insulated lid;
   preheating the head in the oven to a suitable temperature for welding;
   if required, building up the entire fireface with weld metal applied by gas welding;
   gas welding any cracks in the head while maintaining the preheat temperature and protecting the valve seats and injector well from contact with molton weld metal; and
   after welding, encapsulating the head in the oven with the lid in place and allowing to cool;
   wherein the improvements comprise;
   establishing said suitable preheating temperature at a minimum of about 1800 degrees F. and attaining said suitable temperature over a time period of at least 40 minutes;
   performing welding of the fireface and other repair areas with cast welding rod equivalent to AWS RC1-A specification; and
   continuing the encapsulated oven cooling step for a time sufficient to remove residual stresses.

2. A method as in claim 1 said preheating temperature is established in a range of from about 1800 to 2000 degrees F.

3. A method as in claim 1 wherein the welding is performed by oxy acetylene welding and wherein welding of the fireface is performed using a 214 Smith torch tip equivalent and welding of other repair areas is performed using a 610 Smith torch tip equivalent.

4. A method as in claim 1 wherein the encapsulated oven cooling step is continued for at least 24 hours.

5. A method for repair and rebuilding of pot-type cast iron cylinder heads for diesel engines, said method including the steps of:
   determining the locations of any cracks and rejecting any heads with cracks in the fireface or barrel that go through to the water jacket or that are otherwise unsuitable for weld repair;
   placing each non-rejected head in an individual insulated oven having an insulated lid;
   preheating the head in the oven with a gas flame to a suitable temperature for welding;
   if required, building up the entire fireface with weld metal applied by oxy acetylene welding;
   oxy acetylene welding any cracks in the head while maintaining the preheat temperature and protecting the valve seats and injector well from contact with molten weld metal;
   after welding, encapsulating the head in the oven with the lid in place and allowing to cool; and rough machining the fireface and valve guides and inspecting for remaining cracks prior to finish machining;
wherein the improvements comprise;
establishing said suitable preheating temperature in a range of from about 1800 to 2000 degrees F. and attaining said suitable temperature over a time period of from 40 to about 60 minutes;
performing welding of the fireface with cast welding rod equivalent to AWS RC1-A specification using a 214 Smith torch tip equivalent;
performing welding of all other repair areas with cast welding rod equivalent to AWS RC1-A specification using a 610 Smith torch tip equivalent; and
continuing the oven cooling step for at least 24 hours.

* * * * *